March 23, 1965 F. BROUWER 3,175,145
MOTIVE MEANS FOR ELECTRICALLY CONTROLLING
DISTANCE BETWEEN A BODY AND OBJECT
Filed June 14, 1961 2 Sheets-Sheet 1

INVENTOR
Frans Brouwer.

By *William J. Newman*
Attorney

March 23, 1965  F. BROUWER  3,175,145
MOTIVE MEANS FOR ELECTRICALLY CONTROLLING
DISTANCE BETWEEN A BODY AND OBJECT
Filed June 14, 1961  2 Sheets-Sheet 2
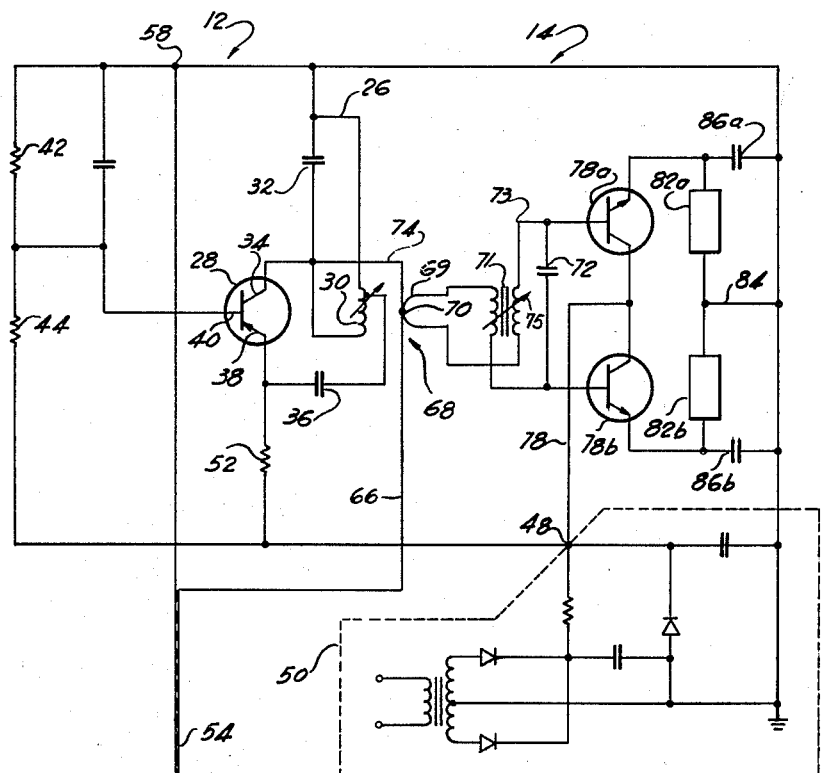
FIG.2.
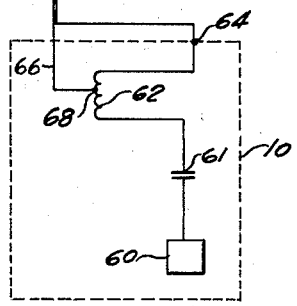
INVENTOR
Frans Brouwer
By
Attorney

3,175,145
MOTIVE MEANS FOR ELECTRICALLY CONTROLLING DISTANCE BETWEEN A BODY AND OBJECT
Frans Brouwer, Glencoe, Ill., assignor to Stewart-Warner Corporation, Chicago, Ill., a corporation of Virginia
Filed June 14, 1961, Ser. No. 117,106
9 Claims. (Cl. 318—293)

This invention relates to electronic coupling circuitry and more particularly to novel circuitry for coupling the outputs of electronic oscillators to frequency responsive networks such as band-pass or band-elimination filters, or frequency discriminators.

This invention was originally conceived as a part of a device for measuring variable quantities of the type in which the variations cause fluctuations in the reactive characteristics of an electronic oscillator resulting in a shift of frequency at its output. Specifically, this invention was a result of design work for producing a height control device for use with automatic gas torch cutting apparatus of the type disclosed in my copending application, Serial No. 56,920, filed September 19, 1960, now Patent No. 3,124,691. In this device, a change in capacitance between a probe attached to the gas torch and the work piece is caused to operate motive means to maintain the torch at a predetermined distance from the work piece. In view of this original application of the invention the detailed explanation to follow is directed toward its use as a height gauge. With slight variations to the circuit of the device, however, it may be used to measure reactive components such as inductances or capacitances directly or to measure fluctuations therein. Similarly, it may be applied to the measurement of any physical property, such as material composition, dielectric constants, size or space relationship, etc., in which changes therein are determinant of the reactive characteristics of an appropriate transducer, which may be coupled to the electronic circuit of this invention. It will be understood, as the detailed description progresses, that there may be broader application of certain features of this invention than the specific ones mentioned above. These features will be emphasized when encountered in the following description.

In previous measuring devices of the type, hereinbefore mentioned, the use of bridge circuits was emphasized in which the unknown reactive component or the reactive reflecting transducer was inserted in one leg. By manipulation of the components in one or more of the other legs to obtain a null reading at the bridge output, a determination of the unknown reactive component was made. This type of circuit required a substantial number of accurately calibrated electrical components which render it less economical and overburdensome for many applications. It is therefore an object of this invention to provide a new type of device for measuring the value of, or changes in, reactive components and/or other physical characteristics which is more economical than comparable prior art devices while maintaining comparable accuracy.

It is also an object of the invention to provide a new type of device for the measurement of reactive characteristics which does not involve the use of bridge circuits.

It is another feature of this invention to provide novel means for coupling frequency responsive circuits to the output of electronic oscillators wherein frequency stability and sensitivity are adequately maintained.

Other objects and advantages of this invention will become obvious upon a further reading of this specification.

In accordance with its application to measuring devices the apparatus of this invention comprises an oscillator circuit which may be coupled to the unknown quantity by probe means. The unknown quantity reflects a particular inductance or impedance to the oscillator in a manner so as to determine the output frequency of the oscillator. The oscillator output is applied to a band-pass filter comprising the input of a frequency discriminator circuit of the type frequently used in frequency modulated receivers, and the oscillator and band-pass filter are initially tuned to a frequency representative of a certain value of inductance or impedance. The band filter and oscillator output are loosely coupled to maintain optimum frequency stability of the oscillator. At the output of the discriminator circuit an electric signal appears which is representative of the value of the unknown quantity.

In accordance with the feature of this invention relating to the coupling of a frequency responsive circuit to the output of an oscillator, the resonant circuit of the oscillator forms a part of the input to the frequency responsive circuit. The inductance in the resonant circuit is loosely coupled to a loop winding which is serially connected between two inductances forming of a second resonant circuit in the frequency responsive circuit. The oscillator output is also directly connected to a tap at the center of the loop winding.

This invention will be better understood upon a further reading of the following detailed explanation taken in view of the accompanying drawings in which:

FIG. 2 is a schematic drawing of electrical circuitry usable in the application of the teachings of this invention.

Figure 1:
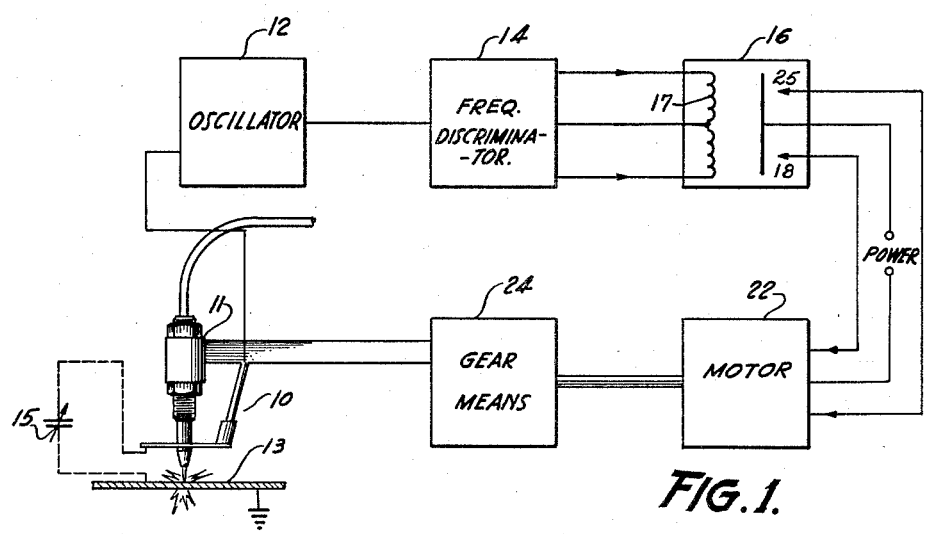
FIG. 1 is a schematic block diagram of one type of height control device employing the teachings of this invention.

As mentioned the schematic block diagram of FIG. 1 is descriptive of this invention as it applies to an automatic height control for a gas cutting torch or the like. A capacitive transducer 10 is positioned adjacent a gas torch 11 which is cutting a pattern in a work piece 13. The transducer 10 is in capacitive relationship to the work piece 13 as shown by the phantom capacitance 15 and the capacity therebetween is variable in accordance with the distance between the transducer and the body. The capacity determines the output frequency of an oscillator 12 which is initially tuned to a frequency corresponding to a predetermined height of the transducer 10 above the work piece 13.

The output of the oscillator 12 is fed to a frequency discriminator circuit 14 of the general type found in many frequency modulation receiver circuits. The frequency discriminator 14 detects any change in frequency representative of a change in the height of the transducer from the work piece and transcribes the frequency difference to a usable electric signal at its output. In this embodiment, the discriminator 14 transforms the frequency differential into a direct current signal having a polarity and magnitude representative of the variation in height from a predetermined level of the transducer 10 from the work piece.

The D.C. signal from the frequency discriminator 14 is used to operate a control means such as a bipolar relay 16 for determining the direction of operation of a motor 22. The motor 22 is operative through suitable gear means 24 to raise or lower the transducer 10 and torch 11 with respect to the work piece 13. If the polarity of the D.C. signal applied to the bipolar relay is of one polarity it will operate the contacts 25 in a direction to energize the motor 22 to raise the height of the transducer 10 above the work piece through the gearing means 24. If the signal applied to the bipolar relay winding 17 is of the opposite polarity it will operate the contacts 18 in the other direction to energize the motor 22 to lower the transducer 10 with respect to the work piece through the gearing means 24. There is thus provided an automatic device operating with servo mechanism techniques to maintain a predetermined distance between the capacitive transducer 10 and the work piece 13 upon which the torch is operating.

The oscillator 12 shown in detail in FIG. 2 has a tank circuit 26 which comprises an inductance 30 and a capacitor 32 connected in parallel between the collector 34 of transistor 28 and ground. The inductance 30 is preferably variable to provide for manual manipulation of the oscillator frequency; however, a variable capacitor at 32 could provide a like adjustment. A small portion of the signal across the coil 30 is fed back through blocking capacitor 36 to the emitter 38 of the transistor 28. The base 40 of the transistor 28 is connected to the junction between two series connected resistors 42 and 44 serving as a voltage divider between the output terminal 48 of the stabilized power supply 50 and ground. The emitter 38 of the transistor 28 is also connected through a stabilizing resistor 52 to the output terminal 48 of the power supply 50. Although the oscillator 12 shown in FIG. 2 is a Hartley type, it is to be understood that any type of self-sustaining oscillator having a resonant circuit including an inductance may be used.

The capacitive transducer 10 is connected through a shielded cable 54 across the tank circuit 26, the cable shield being connected to ground at 58. The transducer 10 comprises a plate 60 which is attached with an electrical insulator to the tool or gas cutter 11 and is readily translatable therewith with respect to the work piece. The plate 60 forms a capacitor with the work piece which is adequately connected to ground through its supporting means. The plate 60 is connected through a capacitor 61 to one end of a coil 62, the other end of which is connected to the grounded cable shield at 64.

The center lead 66 of the cable 54 has one end connected to a tap 68 on the coil 62 with its other end connected to the collector circuit of transistor 28.

The tapped coil 62 is used for coupling the plate 60 to the cable 54 because of the large capacitance of the cable with respect to the limited value of the capacitance between the sensing plate 60 and the work piece, which is usually in the order of magnitude of a few micro microfarads. The connecting cable 54 between the transducer and the oscillator usually will have a capacitance which approaches, if not surpasses, the measured capacitance. Therefore, it is necessary, for reliable measurement, that the measured capacity, as seen by the tank circuit 26, be substantially larger than the capacitance of the cable 54. The tapped coil 62 operates as an auto transformer so that the measured capacitance as seen by the tank circuit is equal to the actual measured capacitance times the square of the ratio of the total number of turns of the coil 62 and the number of turns between the tap 68 and the grounded end. The tapped coil 62 is located close to the sensing plate 60 so that the capacitance of the short cable between the coil and the sensitive plate is small compared with the measured capacitance between the plate and the work piece.

Referring again to the tank circuit 26, it will be noted that the reflected capacitance from the transducer 10 forms an additional capacitive component in parallel with the tank circuit, and consequently, its value will affect the resonant frequency. Since the reflected capacity will change as the distance between the sensing plate 60 and the work piece changes, the resonant frequency of the tank circuit 26 will vary in accordance with the variations in distance. The initial resonant frequency of the tank circuit 26 may be manually adjusted to correspond to a predetermined desired distance of the sensing plate and, hence, the gas cutter from the work piece. This may be accomplished by varying the inductance of the coil 30 or it may be accomplished by varying the capacitance of a variable capacitor in place of the fixed capacitor 32.

The output of the oscillator 12 is directly applied to the input of the frequency discriminator 14. The frequency discriminator shown is the widely used type known as the "series" or center tuned discriminator. A special coupling transformer 68 is used between the oscillator and the discriminator. The secondary of the transformer 68 is formed by a loop winding 69 having a center tap 70 which is directly connected to the collector circuit of the oscillator. The primary of the input transformer 68 comprises the coil 30 in the tank circuit 26 connected to the collector of the oscillator transistor.

The loop winding 70 is connected in series between two bifilar wound coils 71 and capacitor 72 parallels the series connected windings to form a resonant circuit 73. The bifilar wound coils 71 are used in series with the loop winding 69 in order that the resonant circuit 73 may be tuned by the adjustment of a single tuning slug 75 in the coil 71. With this arrangement it is assured that the two coils 71 are tuned equally and that balance is maintained in the resonant circuit on either side of the loop winding 69.

The resonant circuit 73 is connected to the inputs of two transistors 78a and 78b which operate as rectifiers to feed the series connected load impedances 82a and 82b. The connections of the two transistors 78a and 78b in the discriminator circuit will be described more fully hereinafter as they form a separate feature of the improved capacitance measuring device.

The primary and secondary circuits of the coupling transformer 68 are both adjusted to resonance in the center of the pass-band. The A.C. voltage applied to the transistors 78a and 78b consist of two components, namely, that which is induced in the secondary by the inductive coupling and that which is fed to the center of the secondary from the collector circuit of the oscillator. The phase relations between the two are such that, at resonance, the rectified load currents are equal in amplitude but flow in opposite directions through the load impedances 82a and 82b. Hence, the net voltage across the series connected impedances is zero. When the frequency of the oscillator deviates from resonance of the two tank circuits 26 and 73, the induced secondary current either lags or leads depending upon whether the deviation is to the high or low frequency side. This phase shift causes the induced current to combine with that fed through the center tap 70 in such a way that one transistor receives a higher voltage signal than the other when the frequency is higher than resonance and vice versa when the frequency is lower than resonance.

Figure 3:
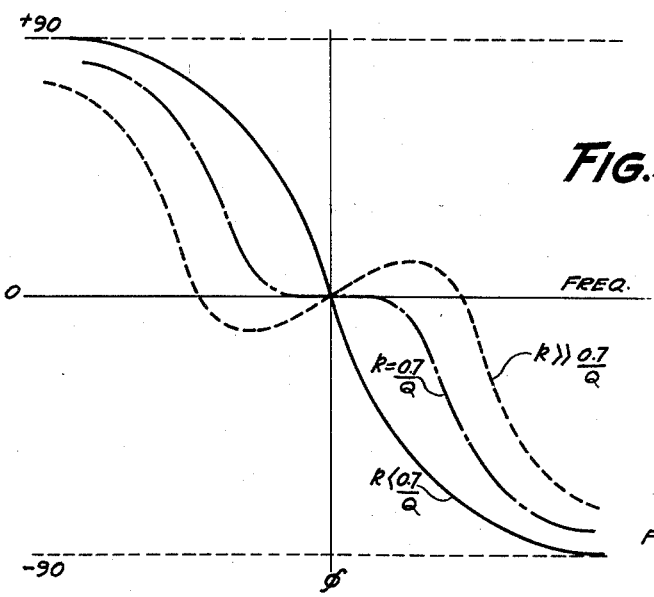
FIG. 3 is a phase characteristic of the R.F. coupling circuitry described.

The arrangement whereby an oscillator directly feeds the band filter input of a frequency discriminator or, for that matter any band filter, is believed novel and requires the maintenance of certain relations which will be defined. It has been found that the band filter loading of an oscillator materially affects the phase characteristics and, hence, the stability of the oscillator. It has further been found that the coefficient of coupling between the oscillator tank circuit and the band filter is the major contributing factor to the altered phase characteristics and stability as shown by the curves of FIG. 3. It has also been found that a coefficient of coupling (K) greater than $0.7/Q$ causes instability in the oscillator because of the shift in the sign of the slope of the curves as shown in FIG. 3. Below a coupling factor of $0.7/Q$, however, there is no shift in the sign of the slope and the oscillator is stable. Of course, a reduction in the coefficient of coupling (K) also reduces the sensitivity of the device so a compromise must be made to obtain acceptable sensitivity while operating in a stable range. It has been found that optimum stability with suitable sensitivity may be obtained if the coefficient of coupling is maintained between $.3/Q$ and $.5/Q$ where Q is the combined effective quality factor of the two resonant circuits 26 and 73 as defined by the expression $\sqrt{Q_{26}Q_{73}}$.

The stability of the circuit with respect to varying loads at the output of the resonant circuit 73 may also be optimized by the proper choice of parameters in the two tuned circuits 26 and 73. Since the lead 74 directly connects the tuned circuit 26 to the center of the winding 69 of the second tuned circuit 76, the capacitance and inductance reflected back to the oscillator are, respectively, four times and one fourth of their actual values. Therefore, if the inductance of the bifilar coils 71 is four times that of the inductance of coil 30 and the capacitance of condenser 72 is one fourth of the value of capacitance 32, the loading at the output of the band filter will have a minimum effect on the (D.C.) signal output of the system as it will equally effect both tuned circuits of the oscillator 26 and of the discriminator 14.

It is to be understood that the mutually coupled tuned circuits 26 and 76 need not be a part of a frequency discriminator circuit as illustrated in the embodiment shown in FIG. 2. They may be used as a band-pass filter in any application where it is advantageous to directly drive the filter with an oscillator. Such an application might be in a laboratory quality signal generator in which economical construction is a desired factor.

To continue with the description of the circuit of FIG. 2, each side of the resonant circuit 73 is connected to the base of the respective detector transistors 78a and b. The collectors of the two transistors 78a and b are interconnected with a common connection to the voltage supply 50. A pair of equal impedances 82a and 82b are series connected between the respective emitters of the two transistors 78a and 82b. The interconnection between the two impedances 82a and b is connected to ground through a lead 84. Alternating current by-pass condensers 86a and 86b are in parallel with each of the impedances 82a and 82b to shunt A.C. variations in the signal to ground.

As described before, the signal across the series connected impedances 82a and 82b will be zero if the signal fed to the frequency discriminator 14 is precisely the frequency to which the circuit was initially tuned. If the applied signal is off the resonant frequency a D.C. component will appear in the signal across the two impedances, the polarity and magnitude of which will be dependent upon the direction and amount the signal is off resonance.

In the application of this circuit to a height control the two impedances 82a and b form the windings of the bipolar relay 16 (FIG. 1). Thus, if the transducer sensing plate 60 is at a position greater than the predetermined distance from the workpiece, the capacity reflected to the resonant circuit 26 of the oscillator 12 will cause the generated frequency to be greater than the initially pretuned frequency. The frequency discriminator will detect this change in frequency and will cause an unbalance in the current flow through the two bipolar windings. If the unbalance in current flow is sufficient to operate the contacts, the motor 22 will be energized to operate in a direction to bring the sensing plate 60 toward the work piece 13. When it arrives at the preset distance above the work piece the current through the windings of the bipolar relay 16 will again be equal and the contacts restored to their off position.

Likewise, if the sensing plate 60 is closer to the work piece 13 than the predetermined distance, the capacity therebetween will increase causing the frequency of the oscillator 12 to be lower than normal. The frequency discriminator 14 will cause an unbalanced current signal through the bipolar relay windings in the opposite direction so as to close the opposite contacts and energize the motor 22 in the opposite direction to restore the sensing plate 60 to its predetermined position.

The circuit of the bipolar relay 16 has a small dead zone in the middle of the range which provides stability to the device. If the dead zone were not provided the inertia of the system might cause the sensing head to overshoot the predetermined distance and cause oscillations of the device about the desired position.

The transistors 78a and b are provided in the circuit of FIG. 2 rather than ordinarily used diodes to further reduce the loading on the filter and oscillator circuits. The load impedance, as seen at the input to the frequency discriminator, is greater with the transistors than with diodes by a factor of $(1+\beta)$ where $\beta$ is the current amplification of the transistors. Thus, with the use of the transistors 78a and b the operating characteristics of the circuit are materially improved. It is obvious, of course, that by using the transistors the current output of the detector circuit through the impedances 82a and b is substantially increased so that a current responsive device such as the bipolar relay 16 may be directly energized.

Although there has been shown in FIGS. 1 and 2 the application of this novel circuit to a device for determining fluctuations in distance, it is to be understood that it may be applied to many other uses which would require only minor modifications to the transducer and/or to the output circuit. For instance, the circuit may be used to measure absolute values of inductance or capacitance or variations in the values thereof. In such cases the inductance or capacitance could be connected directly across the oscillator resonant circuit 26 or perhaps attached to suitable probe means. A meter across the respective emitters of the detector transistors 78a and b, properly calibrated, may be used to read directly the value of the reactive component. It is also contemplated that the circuit may be used in a similar manner as a hole gage, thickness gage, or any other application in which a deviation from a predetermined physical reference may be used to change the frequency output of the oscillating circuit.

As may be seen, there are many modifications and embodiments to which this invention may be applied. It is therefore intended to be bound not by the embodiments disclosed herein but only by the scope of the appended claims.

What is claimed is:

1. A device for measuring a change in value of a capacitive impedance comprising an oscillator having a tank circuit, said tank circuit connected across said impedance and having a coil forming the primary of a transformer, the resonant frequency of said tank circuit being dependent on the value of said capacitive impedance, a frequency discriminator having a resonant circuit, a pair of bifilar wound coils in said frequency discriminator resonant circuit, means for simultaneously and equally adjusting the inductance of said coils, another coil forming the secondary of said transformer and series connected between said pair of coils, said frequency discriminator resonant circuit being center tuned to a resonant frequency corresponding to a predetermined value of said capacitive impedance, whereby said frequency discriminator has a D.C. output proportional to said change in capacitive impedance.

2. A device for controlling the distance of an object from a reference body comprising a probe supporting said object in capacitive relationship with said body, said capacitive relationship dependent on said distance, an oscillator having a tank circuit and a coil within said tank circuit forming the primary of a transformer, means for applying the capacitive impedance of said probe across said tank circuit, the resonant frequency of said tank circuit being dependent on the value of said capacitive impedance, a frequency discriminator having a resonant circuit and a pair of bifilar coils in said resonant circuit, an iron core adjustably situated within said coils, another coil forming the secondary of said transformer and series connected between said pair of coils, the coefficient of coupling between said primary and secondary coils being less than $1/Q$ but greater than $.1/Q$ where Q is the combined quality factor of said tank circuits, said frequency discriminator resonant circuit being center tuned to a resonant frequency corresponding to a predetermined distance of said object from said reference body, said frequency discriminator having a D.C. output corresponding to a variation from said predetermined distance, and motive means for returning said object to said predetermined distance.

3. A device for controlling the distance of an object from a reference body comprising a probe supporting said object in capacitive relationship with said body, said capacitive relationship dependent on said distance, an oscillator having a tank circuit and a coil within said tank circuit forming the primary of a transformer, means for reflecting the capacitive impedance of said probe across said tank circuit, the resonant frequency of said tank circuit being dependent on the value of said capacitive impedance, a frequency discriminator having a resonant circuit and a pair of bifilar wound coils in said resonant circuit, means for simultaneously and equally varying the impedance of said coils, another coil forming the secondary of said transformer and series connected between said pair of coils, said frequency discriminator resonant circuit being tuned to a resonant frequency corresponding to a predetermined distance of said object from said reference body, said frequency discriminator having a D.C. output corresponding to a variation from said predetermined distance, and motive means for returning said object to said predetermined distance.

4. A frequency demodulation circuit comprising a tank circuit having a capacitance and an inductance, means for applying a signal across said inductance, means for directly applying said signal to the center of said inductance, a pair of transistors having their respective bases connected to respective sides of said tank circuit, means for equally connecting a D.C. voltage source between the emitter and collector of each transistor, said connecting means including a pair of equal impedances connected to ground at their one ends and connected to respective transistors at their other ends.

5. A frequency demodulation circuit comprising a tank circuit having a capacitor and an inductance, means for applying the frequency modulated signal across said inductance, means for directly applying said modulated signal to the center of said inductance, a pair of transistors having their respective bases connected to respective sides of said tank circuit and their respective collectors commonly connected to a voltage source, a pair of series connected impedances connecting the respective emitters, and a ground connection between said series connected impedances.

6. A device for measuring changes in a capacitance comprising a self-sustaining oscillator, said oscillator comprising a first transistor and a tank circuit having a capacitor and an inductance in the collector circuit, means for connecting said variable capacitance in parallel with said tank circuit whereby the resonant frequency of said tank circuit corresponds to the value of said capacitance, a second tank circuit having a second inductance and second capacitance and center tuned to a frequency corresponding to a predetermined value of said capacitance, a center winding of said second inductance mutually coupled to the inductance of said oscillator tank circuit, means for connecting the center of said center winding to the collector of said transistor, a pair of transistors having their respective bases connected to respective sides of said second tank circuit, a source of D.C. voltage commonly connected to the collectors of each of said pair of transistors, a pair of equal impedances grounded at their one ends connected to respective emitters of said pair of transistors at their other ends, whereby the D.C. component of the voltage signal between said emitters corresponds to a variation from said predetermined value of capacitance.

7. The device of claim 6 wherein the coefficient of coupling between said tank circuits is less than $1/Q$ but greater than $.1/Q$ where Q is the combined quality factor of said tank circuits.

8. A device for measuring a change in value of an impedance comprising an oscillator having a tank circuit, said tank circuit connected across said impedance and having a coil forming the primary of a transformer, the resonant frequency of said tank circuit being dependent on the value of said impedance, a frequency discriminator having a resonant circuit, a pair of bifilar wound coils in said resonant circuit, means for simultaneously and equally adjusting the inductance of said coils, another coil forming the secondary of said transformer and series connected between said pair of coils, said resonant circuit being center tuned to a resonant frequency corresponding to a predetermined value of said impedance whereby said frequency discriminator has an output indicative of said change in impedance.

9. A device for measuring a change in value of an impedance comprising an oscillator having a tank circuit, the resonant frequency of said tank circuit being dependent on the value of said impedance, a frequency discriminator having a resonant circuit, a pair of bifilar wound and interconnected coils in said tank circuit, means directly coupling the tank circuit output to he interconnection between said coils, means loosely coupling the output of said tank circuit to said resonant circuit, and means for simultaneously and equally adjusting the inductance of said coils.

References Cited by the Examiner
UNITED STATES PATENTS

| | | | |
|---|---|---|---|
| 2,464,193 | 3/49 | Wild | 318—28.1 |
| 2,494,934 | 1/50 | Douchette | 324—60 |
| 2,512,372 | 6/50 | Pakala | 331—65 |
| 2,837,662 | 6/58 | Ehret | 307—88.5 |

ORIS L. RADER, *Primary Examiner.*

M. O. HIRSHFIELD, *Examiner.*